INVENTORS:
ALEXANDRE IVANOFF
YVES LE GRAND
BY PIERRE CUVIER

A. John Michel
ATTORNEY.

Jan. 10, 1956　　　A. IVANOFF ET AL　　　2,730,014
OPTICAL SYSTEM FOR DISTORTIONLESS UNDERWATER VISION
Filed Feb. 19, 1952　　　　　　　　　　　　　　3 Sheets-Sheet 2

INVENTORS:
ALEXANDRE IVANOFF
YVES LE GRAND
PIERRE CUVIER
BY
ATTORNEY.

INVENTORS:
ALEXANDRE IVANOFF
YVES LE GRAND
PIERRE CUVIER
BY
a. John Michel
ATTORNEY.

United States Patent Office 2,730,014
Patented Jan. 10, 1956

2,730,014

OPTICAL SYSTEM FOR DISTORTIONLESS UNDERWATER VISION

Alexandre Ivanoff, Yves Le Grand, and Pierre Cuvier, Paris, France; said Le Grand and said Cuvier assignors to said Ivanoff Application February 19, 1952, Serial No. 272,416

Claims priority, application France February 22, 1951

8 Claims. (Cl. 88—57)

The present invention relates to optical systems for distortionless underwater or submarine vision.

It is well known that for underwater or submarine photography, submarine cinematography or submarine television, it is generally considered as sufficient to place the camera lens behind a window constituted by a mere sheet of glass or by any other transparent material having parallel faces. The water to air plane diopter thus constituted diminishes the field $\alpha$ in a ratio equal to the index $n$ of refraction of the water and besides introduces considerable aberrations at the periphery of the optical field. In order to avoid these drawbacks, special camera lenses have been made in which the first lens constitutes the window. This arrangement is very expensive as the whole camera lens has to be computed and made for the intended purpose.

The present invention consists, according to one of its features, in arranging in front of an ordinary camera lens an optical system as simple as possible, the front face of which constitutes the window and which is adapted to provide a virtual image of an immersed object, the said image being located in the air and superposed to the object. This virtual image acts as an object for the camera lens and everything takes place as if the photographed objects were located in the air and in particular, the field $\alpha$ of the camera lens is preserved. Besides, by suitably choosing the radii of curvature and the dispersive powers of the lenses constituting the optical system it is possible to correct the aberrations introduced.

All these advantages may be obtained according to features of the present invention by means of an optical system comprising two lenses only, the first constituting the window. In order to determine the powers of these two lenses it is suggested to write an equation whereby the principal planes of the optical system are coincident with the front plane of the object. The following result is thus obtained:

$$D_1 \text{ diopters} = \frac{1-n}{e}$$

and $$D_2 \text{ diopters} = \frac{D_1}{n\left(1-\dfrac{e}{p}\right)}$$

wherein $n$ is the index of refraction of water, $e$ the distance from the principal image point of the first lens to the principal object point of the second and $p$ the distance from the principal object point of the first lens to the plane of the front object. Besides, the ratio $e/p$ being small, the optical system thus computed for a certain distance $p$ of the object remains quite satisfactory whatever the distance $p$ may be.

In order to determine the powers of the two lenses constituting the optical system, it is just the same to write that the nodal image point of the first lens is at the principal object point of the second and that the power of this second lens is such that it gives of the intermediate image $A''B''$ a final image $A'B'$ superposed to the object $AB$.

Another feature of the present invention appears thus clearly: it is sufficient to modify the power $D_2$ of the second lens so that the final image $A'B'$ is formed at any desired distance whilst appearing very substantially under the same angle $\beta$ as the object $AB$. The field of the camera lens will be preserved under these conditions without the virtual image provided by the optical system being superposed to the object.

In order to correct the chromatic aberration of the optical system it is suggested to write an equation whereby the powers $D_1$ and $D_2$ of the two lenses constituting it are the same for the two rays C and F of the spectrum for example. Thus one is led to cut out the first lens from a piece of glass material the dispersive power of which is nearly the same as that of the water, and the second from a piece of glass material having a very small dispersive power. It is of course possible, if necessary, to improve the correction of the chromatic aberration thus realized by replacing each one of the two lenses of the system, or one of them, by a set of two joined lenses having dispersive powers suitably chosen.

The astigmatism may be corrected either for the light rays not much inclined on the system axis, or for the light rays making with the axis a certain angle (for example an angle $\alpha/2$ equal to half the field of the camera lens). In the first case, and for a distance $\pi$ of the second lens to the incoming pupil of the camera lens comprised between 2 and 3 centimetres, one may chose for the optical system two lenses substantially plane-spherical, the two spherical faces facing each other. As for the chromatic aberration, it is of course possible to improve the correction of the astigmatism by increasing the number of lenses. It is also possible, if necessary, to correct in this way other aberrations.

Finally, the diameter of the two lenses constituting the optical system is dimensioned in order not to limit the field $\alpha$ of the camera lens. The diameter of the second lens must be greater than $2\pi \operatorname{tg}\alpha$ ($\pi$ being as above the distance of the second lens to the incoming pupil of the camera lens), whereas the diameter of the first lens must be equal to that of the second multiplied by the ratio $$\frac{e+\pi'}{\pi'}$$

$e$ being as above the distance between the two lenses constituting the optical system, and $\pi'$ being the distance between the second lens and the image of the incoming pupil of the camera lens through this lens. It is fitting besides to take into account the thicknesses of the lenses (mainly of the first, quite thick at the periphery) and also to avoid the so-called "vignette" effect.

The invention will be best understood by referring to the accompanying drawings which illustrate the principles on which rests the invention as well as certain embodiments of the invention. In the drawings.

Figure 1:
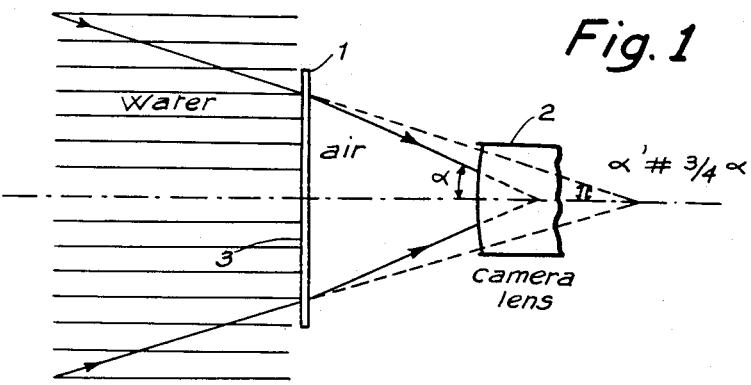
Figs. 1, 2, 3 and 4 are explanatory drawings of certain principles on which rests the present invention.

Referring to the drawings, there is shown an optical system intended for underwater vision. The device shown in Fig. 1 comprises a window 1 placed directly in contact with water 3 and an optical system or camera lens 2. As it will be seen, this is a system as used in the prior art. Such a system comprises a water to air plane diopter which diminishes the field α in a ratio equal to the index *n* of refraction of the water and introduces besides considerable aberrations at the periphery of the optical field. The field α' of such a device is substantially equal to ¾ of the field α of the camera lens.

Figure 2:
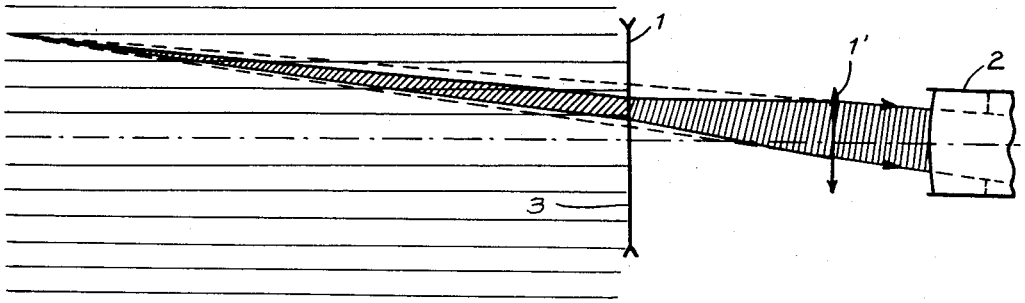

Fig. 2 represents an optical system comprising two lenses 1 and 1' placed in front of an optical system 2. As it will be seen, such a system provides a virtual image which acts as an object for the camera lens and this image is superposed onto the immersed object.

Figure 3:
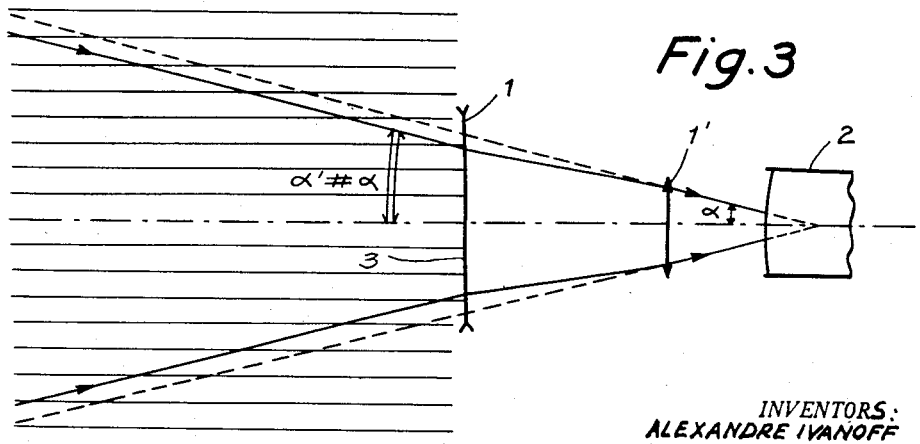

Fig. 3 represents the same optical system as in Fig. 2 and shows that it permits preserving substantially the field α of the camera lens.

Figure 4:
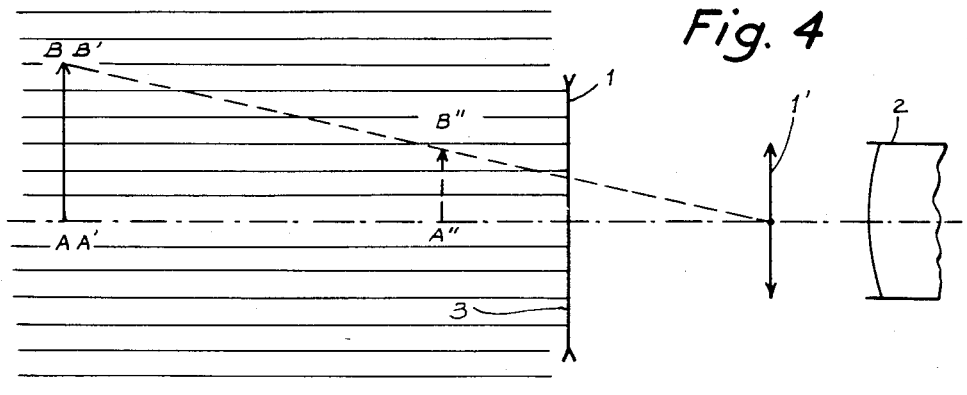

In Fig. 4 there is shown that in the system already shown in Figs. 2 and 3 the nodal image point of the first lens 1 is at the principal object point of the second lens 1'.

Figure 5:
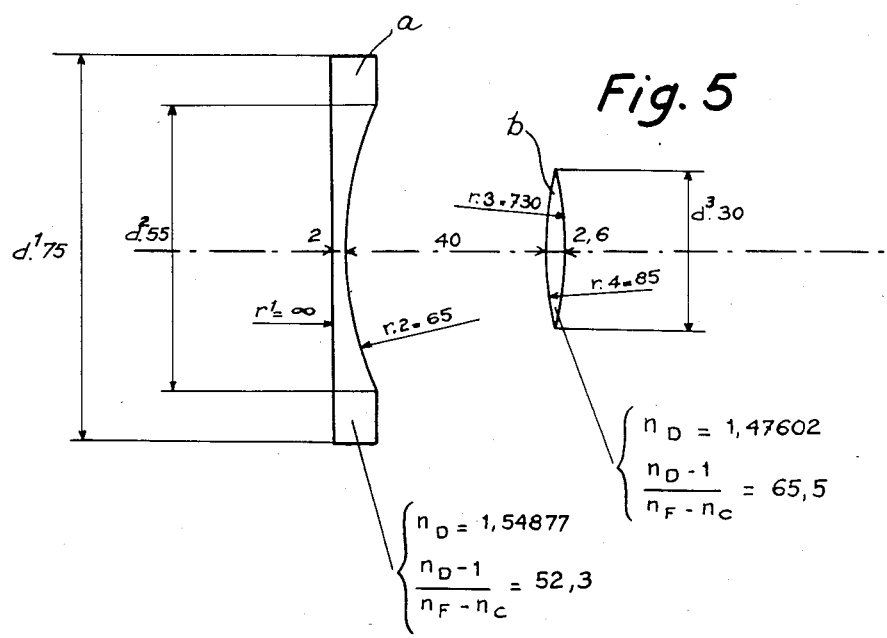
Figs. 5 and 6 represent details of two optical systems dimensioned according to the features of the invention.
Figure 6:
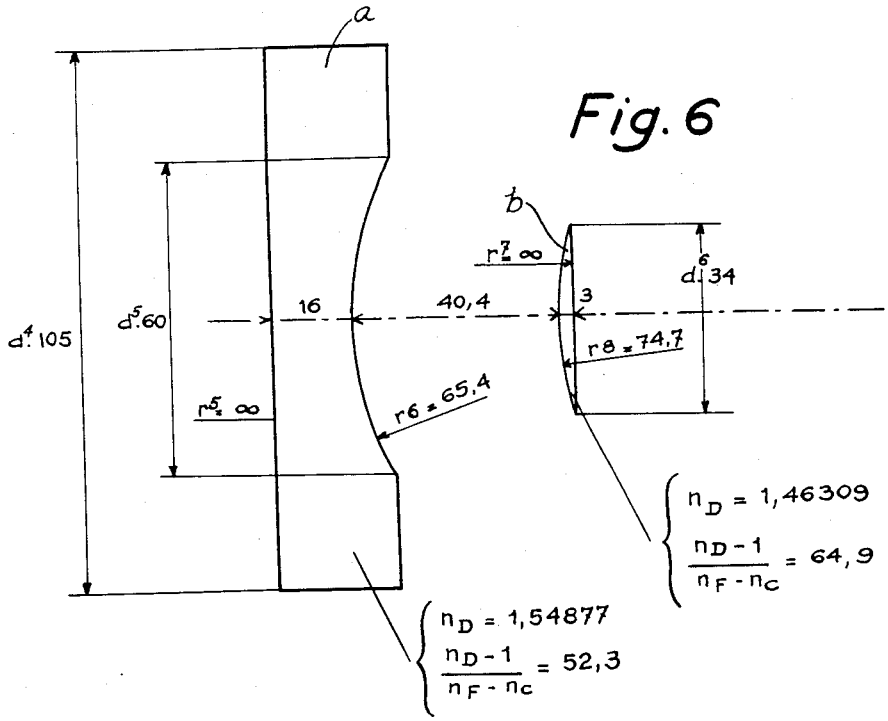

Figs. 5 and 6 represent actual dimensions of two optical systems *a* and *b* to be described more in detail later and which have given excellent results in practice.

The invention is illustrated by two embodiments represented in Figs. 5 and 6 and given of course by way of examples and not as limiting the invention. In these examples, the optical system is dimensioned, as it has just been explained, for the following case:

Index of sea water: $n=1,339$
Dispersive power of sea water:

$$\frac{n_0-1}{n_F-n_c}=52.3$$

Distance between the two lenses: $e=4$ cm.
Distance between the second lens and the incoming pupil of the camera lens: $\pi=3$ cm.
Distance from the object to the first lens: $p=4$ m.

The dimensions for the example illustrated in Fig. 5 are:

Radius of curvature of lens *a*:
  $r_1=$ infinite
  $r_2=65$ mm.
Radius of curvature of lens *b*:
  $r_3=730$ mm.
  $r_4=85$ mm.
Axial thickness of lens *a* $=2$ mm.
Axial thickness of lens *b* $=2.6$ mm.
Axial separation between lens *a* and lens *b* $=40$ mm.
Index of refraction of lens *a*: $n_D=1.54877$
Index of refraction of lens *b*: $n_D=1.47602$
Radius of curvature of lens *a*:
  $r_5=$ infinite
  $r_6=65$ mm.
Radius of curvature of lens *b*:
  $r_7=$ infinite
  $r_8=74.7$ mm.
Axial thickness of lens *a* $=16$ mm.
Axial thickness of lens *b* $=3$ mm.
Axial separation between lens *a* and lens *b* $=40.4$ mm.
Index of refraction of lens *a*: $N_D=1.54877$
Index of refraction of lens *b*: $N_D=1.46309$ The first example (Fig. 5) relates to a camera lens the half angular field α of which is equal to 23° 30' (50 mm. camera lens for 24 x 36 mm. frame photography). The second example (Fig. 6) relates to a camera lens the half angular field α of which is equal to 28° (28 mm. camera lens for 35 mm. cinema film) and is intended for greater depths.

Let β be the angle under which appears the immersed object and β' the angle under which appears the virtual image given of this object by the optical system. The ratio β'/β is equal to in the first example to:

0.99927 for the ray D of the spectrum
0.99928 for the ray F of the spectrum

If the distance of the object varies, the ratio β'/β remains substantially constant. Thus in the first example, when $p=2$ the ratio β'/β is equal to 0.997. Finally, it appears that the ratio β'/β remains substantailly equal to 1 whatever may be the wave length of the light radiation and whatever may be the distance of the object.

It is obvious, on the one hand, that it is possible to cause the optical constants of the system to vary in function of the type of glasses available and of the radii of curvature which may be realized the more easily, and, on the other hand, that it is possible, by increasing the diameter of the lenses, to realize systems for great-angular camera lenses.

The plane glass dive mask of the prior art presents the same drawbacks as the plane glass windows of the prior art for submarine photography. The vision field, already reduced by the mounting of the mask is diminished in a ratio equal to the index *n* of the water and besides the vision is not clear at the periphery of the field. Moreover, and this is perhaps the most important, the immersed objects appear to the diver nearer and greater than they are in fact and this alters completely the vision of the submarine world.

Figure 7:
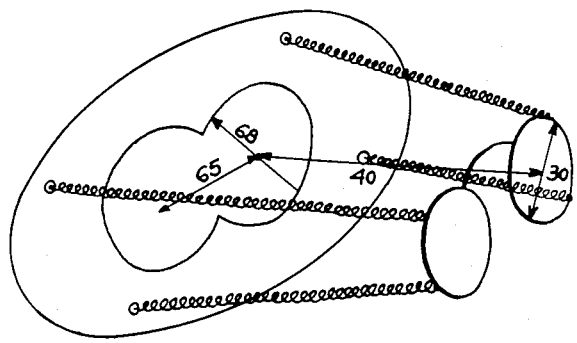
Fig. 7 represents a binocular device intended to be worn by a diver.

According to features of the present invention, it is possible to realize dive masks providing a substantial field of vision and permitting one to see the submarine world with its true dimensions and its true perspective. In this connection it is provided, according to the invention, to place in front of each of the two eyes of the diver a two lens optical system such as described above providing a virtual image of an immersed object, the said image being superposed to the object. The two front lenses constitute the window proper of the mask (they may be cut out of the same glass sheet) whereas the two back lenses constitute a spyglass inside the mask which may be fixed to the mask by means of springs. Fig. 7 represents, by way of a schematic example, an embodiment of the optical part of such a device providing in water a binocular field of vision equal to 60° and permitting to see the submarine world with its true dimensions and its true perspective. The same features may of course be embodied into divers' masks as well as into the windows of submarine boats or into any other type of diving apparatus.

Although the present invention has been described in conjunction with particular embodiments, it is clear that it is not limited to the said embodiments and that it is on the contrary capable of many alternatives and modifications without departing from its scope as defined by the appended claims.

What we claim is:

1. An optical system for distortionless underwater viewing and photographing an object in the water through a boundary between the water and a medium containing viewing means, consisting of a plane-concave divergent lens means with its plano-surface forming the boundary with the water and having a dioptric power $$D_1=\frac{1-n}{e}$$

and a double convex convergent lens means arranged between said divergent lens means and said viewing means, *n* being the refractive index of water and *e* being the distance from the principal image point of the divergent lens means to the principal object point of the convergent lens means.

2. An optical system for distortionless underwater viewing and photographing an object in the water through a boundary between the water and a medium containing viewing means, consisting of a plane-concave divergent lens means with its plano-surface forming the boundary with the water and having a dioptric power $$D_1=\frac{1-n}{e}$$

and a double convex convergent lens means arranged between said divergent lens means and said viewing means and having a dioptric power $$D_2 = \frac{D_1}{n\left(1 - \frac{e}{p}\right)}$$

$n$ being the refractive index of water, $e$ being the distance from the principal image point of the divergent lens means to the principal object point of the convergent lens means, and $p$ being the distance from the principal object point of the divergent lens means to the plane of the object.

3. An optical system as defined in claim 1, wherein said divergent lens means has a dispersive power substantially equal to that of water and the convergent lens means has a very small corresponding dispersive power, whereby chromatic aberrations are corrected.

4. An optical system as defined in claim 1, wherein said divergent and convergent lens means are of the plano-spherical type, the spherical faces of the lens means facing each other, whereby astigmatism is corrected.

5. An optical system as defined in claim 1, wherein the diameter of the convergent lens means is larger than $2\pi$ tangent $\alpha$, in which $\pi$ is the distance from the convergent lens means to the incoming pupil of the viewing means, and $\alpha$ is the angle of the field of vision, and the diameter of the divergent lens means is a multiple of the first-named diameter, the multiplicator being $$\frac{\pi' + e}{\pi'}$$

wherein $\pi'$ is the distance between the convergent lens means and the image of the incoming pupil of the viewing means through the said latter lens means.

6. An optical system for distortionless underwater photographing of an object in the water through a boundary between the water and a medium containing a camera having an objective, consisting of a plane-concave divergent lens means in contact with the water and with its plano-surface forming said boundary, and a double convex convergent lens means arranged between said divergent lens means and said camera objective.

7. An optical system as defined in claim 6, wherein each of said divergent lens means has a dioptric power $$D_1 = \frac{1 - n}{e}$$

$n$ being the refractive index of water and $e$ being the distance from the principal image point of the divergent lens means to the principal object point of the convergent lens means.

8. An optical system as defined in claim 7, wherein said convergent lens means has a dioptric power $$D_2 = \frac{D_1}{n\left(1 - \frac{e}{p}\right)}$$

wherein $p$ is the distance from the principal object point of the divergent lens to the plane of the object.

References Cited in the file of this patent

UNITED STATES PATENTS

| Number | Name | Date |
|---|---|---|
| 1,331,627 | Dilts | Feb. 24, 1920 |
| 1,451,096 | Hagen | Apr. 10, 1923 |
| 1,499,018 | Hertel | June 27, 1924 |
| 1,651,493 | Warmisham | Dec. 6, 1927 |
| 1,841,579 | Hixon | Mar. 29, 1932 |
| 1,892,444 | Bausch | Dec. 27, 1932 |
| 2,001,683 | Jackman | May 14, 1935 |
| 2,088,262 | Grano | July 27, 1937 |
| 2,184,018 | Ort | Dec. 19, 1939 |
| 2,256,133 | Barnes | Sept. 16, 1941 |
| 2,324,057 | Bennett | July 13, 1943 |
| 2,404,556 | Wirth | July 23, 1946 |
| 2,496,430 | Berglund | Feb. 7, 1950 |
| 2,538,077 | Blosse | Jan. 16, 1951 |

FOREIGN PATENTS

| Number | Country | Date |
|---|---|---|
| 414,856 | Great Britain | Aug. 16, 1934 |